(12) United States Patent
Vilardi (10) Patent No.: US 6,592,026 B2
(45) Date of Patent: Jul. 15, 2003

(54) BIOLOGICAL SAFETY MAILBOX

(76) Inventor: Michael Vilardi, 72 Darcy Cir., Islip, NY (US) 11751

( * ) Notice: Subject to any disclaimer, the term of this patent is extended or adjusted under 35 U.S.C. 154(b) by 0 days.

(21) Appl. No.: 10/007,378

(22) Filed: Oct. 22, 2001

(65) Prior Publication Data

US 2003/0075594 A1 Apr. 24, 2003

(51) Int. Cl.$^7$ ................................................ B65D 91/00
(52) U.S. Cl. ............................ 232/17; 312/1; 232/24; 232/39
(58) Field of Search ........................ 232/17, 39, 24, 232/25; 312/1; 248/219.2, 128, 146, 424, 429

(56) References Cited

U.S. PATENT DOCUMENTS

| | | | | |
|---|---|---|---|---|
| 3,084,684 A | * | 4/1963 | Saunders | 312/1 |
| 3,088,627 A | * | 5/1963 | Saunders | 312/1 |
| 4,059,903 A | * | 11/1977 | Piet et al. | 312/1 |
| 5,219,215 A | * | 6/1993 | Akagawa et al. | 312/1 |
| 5,316,733 A | * | 5/1994 | Rune et al. | 422/104 |
| 5,342,121 A | * | 8/1994 | Koria | 312/1 |
| 5,460,564 A | * | 10/1995 | Bowes et al. | 451/89 |
| 5,662,581 A | * | 9/1997 | Jennrich et al. | 600/21 |
| 6,161,756 A | * | 12/2000 | Upton | 232/39 |
| 6,241,328 B1 | * | 6/2001 | Ziff | 312/1 |
| 6,367,518 B2 | * | 4/2002 | Duncan | 141/97 |
| 6,517,429 B1 | * | 2/2003 | O'Connell et al. | 454/56 |
| 2003/0021723 A1 | * | 1/2003 | Ordaz | 422/24 |

* cited by examiner

Primary Examiner—William L. Miller
(74) Attorney, Agent, or Firm—Michael I. Kroll (57) ABSTRACT

A biological safety mailbox made up of a housing, a securable lid, access ports providing access to the interior portion of the housing, and protective gloves that form a seal at the access port while allowing a user to manipulate the contents. A mounting bracket is also provided to permit the user to selectively remove the housing in order to permit a user to use the mailbox to open any mail inside while in a different location. A lock is further included to prevent unauthorized removal of the housing by locking the housing to the mounting bracket. A biological safety mailbox for commercial applications is also disclosed having a large housing partitioned into a plurality of hermetically sealed compartments, each compartment having a pair of glove access ports and an individual lid access port.

5 Claims, 14 Drawing Sheets

BIOLOGICAL SAFETY MAILBOX

BACKGROUND OF THE INVENTION

1. Field of the Invention

The present invention relates generally to containers and, more specifically, to a biological safety mailbox. The biological safety mailbox is comprised of a base container and a removable lid. The base container has spaced apart walls converging into a base. The base and walls are molded into one piece having no seams. Molded into the walls are pluralities of exteriorly extending cylindrically walled conduits forming access ports providing access into the interior of the biological safety mailbox. The conduits have an interior smooth bore and the exterior wall has a circumferential groove positioned oil the exterior distal end periphery wherein an elastomeric O-ring can be positioned. Gloves are positioned within the device with the open end extending beyond the open end of the access ports. The gloves are folded back over the conduit extending past the exterior groove. Once positioned thereon an elastomeric O-ring is place over the conduit until seated within the access port groove which hermetically seals the gloved access port to the base housing. The biological safety container has a hingedly attached lid providing access into the hermetically sealed compartment. The open end of the base container has a compressible gasket and one member of a mating pair of closure fasteners, the other being positioned on the lid, whereby engaging the closure fasteners forces the lid against the base container gasket therein creating a hermetically sealed compartment.

On the underside of the base container are longitudinally extending L-shaped channels having one distal end open and the other closed with a locking element extending therefrom.

An additional element is provided in the form of a substantially planar base having longitudinally extending channels with one open distal end and one closed distal end having a lock element positioned therein. The base member also has a plurality of apertures whereby the base element can be attached to a stanchion, such as a post. Once attached thereto the biological safety mailbox base channels and lock element can be mated with the planar channeled base and locked thereto.

Further additional elements are provided to the biological safety mailbox whereby the mailbox can be used by a plurality of people, such as would be necessary for commercial use. The mailbox has a plurality of gloved access ports providing access to a plurality of compartments. Each compartment is formed by adding a partition to the interior of the device whereby the interior can be divided into a plurality of hermetically sealed compartments. The lid which functions as previously described, being hinged and having closure fasteners, also has a plurality of access ports providing access to each compartment therein. The plurality of compartments are hermetically sealed one from the other. Therefore, if particulate contaminants are discovered in a piece of mail and is suspected of being a potentially harmful agent or microorganism, it is confined to that compartment and will not effect or contaminant the other compartments.

2. Description of the Prior Art

While the existing biological safety containers may be suitable for the purposes for which they were designed, they would not be as suitable for the purposes of the present invention, as hereinafter described.

Therefore it is felt that the need exists for a simple easy to manufacture hermetically sealed gloved box whereby mail can be inserted therein and inspected for particulate contaminants without exposing the individual to said potentially harmful agents.

SUMMARY OF THE PRESENT INVENTION

The present invention is a biological safety mailbox having a base container and a hinged lid. The base container has a plurality of exteriorly extending cylindrically walled conduits forming access ports. The conduits have a circumferential groove positioned on the exterior for the placement of an elastomeric O-ring. Gloves are positioned within the interior of the device with the open end extending through the access port and folded thereover. Once positioned thereon an elastomeric O-ring is place over the conduit until seated within the groove and thereby hermetically sealing the gloved access port to the base housing.

Access to the interior of the biological safety container is gained through a hingedly attached lid which seals to the base container compressible gasket through the use of closure fasteners. The closure fasteners forces the lid against the base container gasket therein creating a hermetically sealed compartment.

On the underside of the base container are longitudinally extending L-shaped channels having an end open and a closed end with a locking element positioned within the closed end that can be mated with an additional element in the form of a bracket that can be mounted to a post. Once attached thereto the biological safety mailbox performs the function of a mailbox.

Further additional elements are provided to the biological safety mailbox to create a multi-user-commercial workstation. The mailbox has a plurality of gloved access ports providing access to a plurality of compartments. Each compartment is formed by adding a partition to the interior of the device thereby dividing the interior into a plurality of hermetically sealed compartments. The lid has a plurality of access ports providing access to each compartment therein. The plurality of compartments are hermetically sealed one from the other. Therefore, if particulate contaminants are discovered in a piece of mail and is suspected of being a potentially harmful agent or microorganism, it is confined to that compartment and will not affect use of the other compartments.

A primary object of the present invention is to provide a sealed transparent unit for opening and inspecting mail prior to exposure to the content of said mail.

Another object of the present invention is to provide a biological safety mailbox having gloved access ports therein.

Yet another object of the present invention is to provide a biological safety mailbox having outwardly extending conduit elements with an exteriorly positioned groove whereupon gloves can be mounted thereto.

Still yet another object of the present invention is to provide a biological safety mailbox having longitudinal base member that will mate with a planar channeled base member.

Another object of the present invention is to provide a biological safety mailbox having a hingedly attached lid.

Yet another object of the present invention is to provide a biological safety mailbox having closure fasteners for compressing the lid to the base container.

Still yet another object of the present invention is to provide a biological safety mailbox having fasteners whereby the device can be mounted to a wall.

Additional objects of the present invention will appear as the description proceeds.

The present invention overcomes the shortcomings of the prior art by providing an easy to manufacture and maintain biological safety mailbox having a plurality of gloved access ports providing access to a hermetically sealed compartment wherein mail and small parcel can be inserted for the purpose of opening and inspecting said mail for particulate contaminants.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the high volume disposable aspirator of the present invention. With regard to the reference numerals used, the following numbering is used throughout the various drawing figures.

10 biological safety mailbox
12 housing member
14 protective gloves
16 lid
18 access port
20 O-ring
22 O-ring retaining channel
24 access recess
25 access port wall
26 lid hinge
28 wall mounting bracket
30 lid closure fasteners
32 lid gasket
34 channeled base
36 mounting bracket
38 mounting recesses
40 screw
42 lock
44 key
46 mounting post
48 interior portion of 12
50 bottom plate of 12
52 walls of 12
54 cuff end of 14
56 finger end of 14
58 interior portion of 14
60 distal end of 25
62 mail
64 tracks of 12
66 tracks of 36
68 lid access port
70 partition
72 sealed compartment
74 mounting bracket apertures
76 mounting post apertures

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
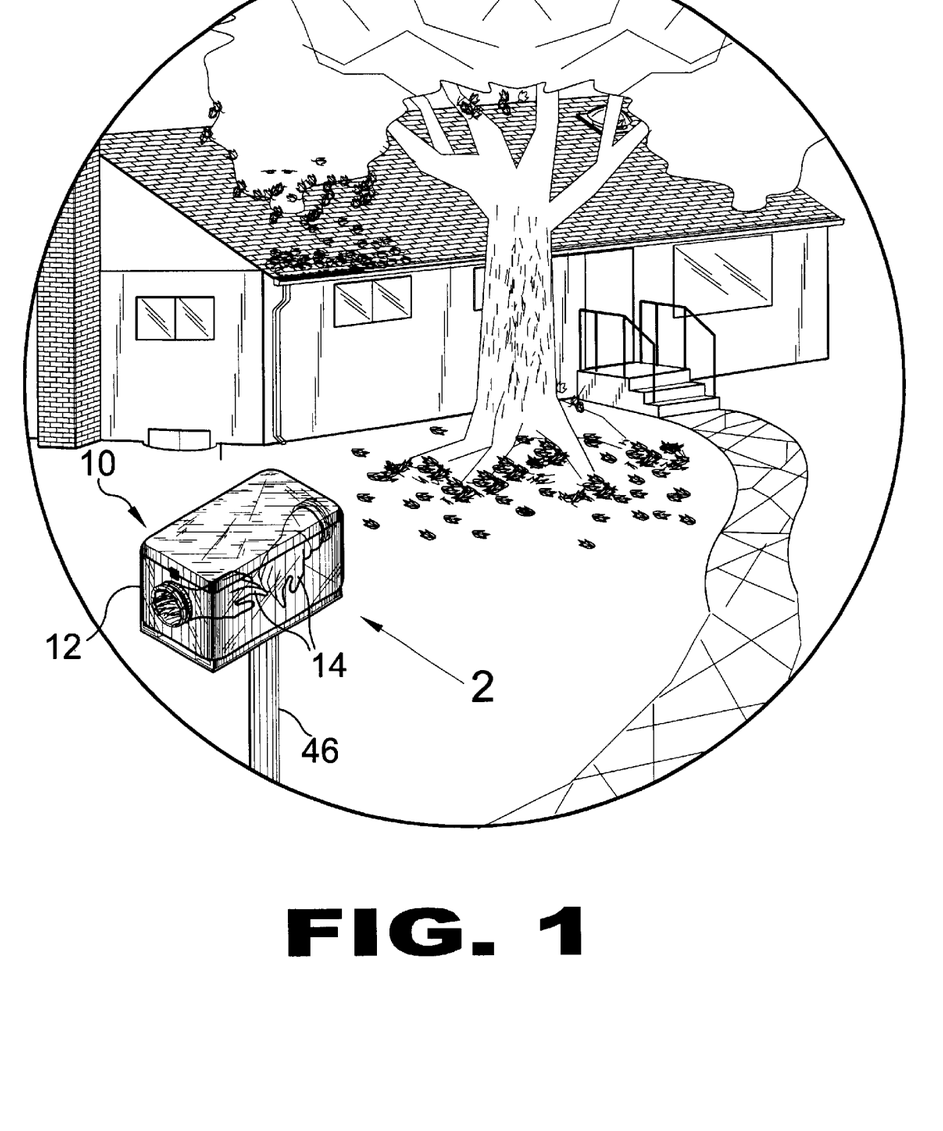
FIG. 1 is an illustrated view of the present invention.
Figure 2:
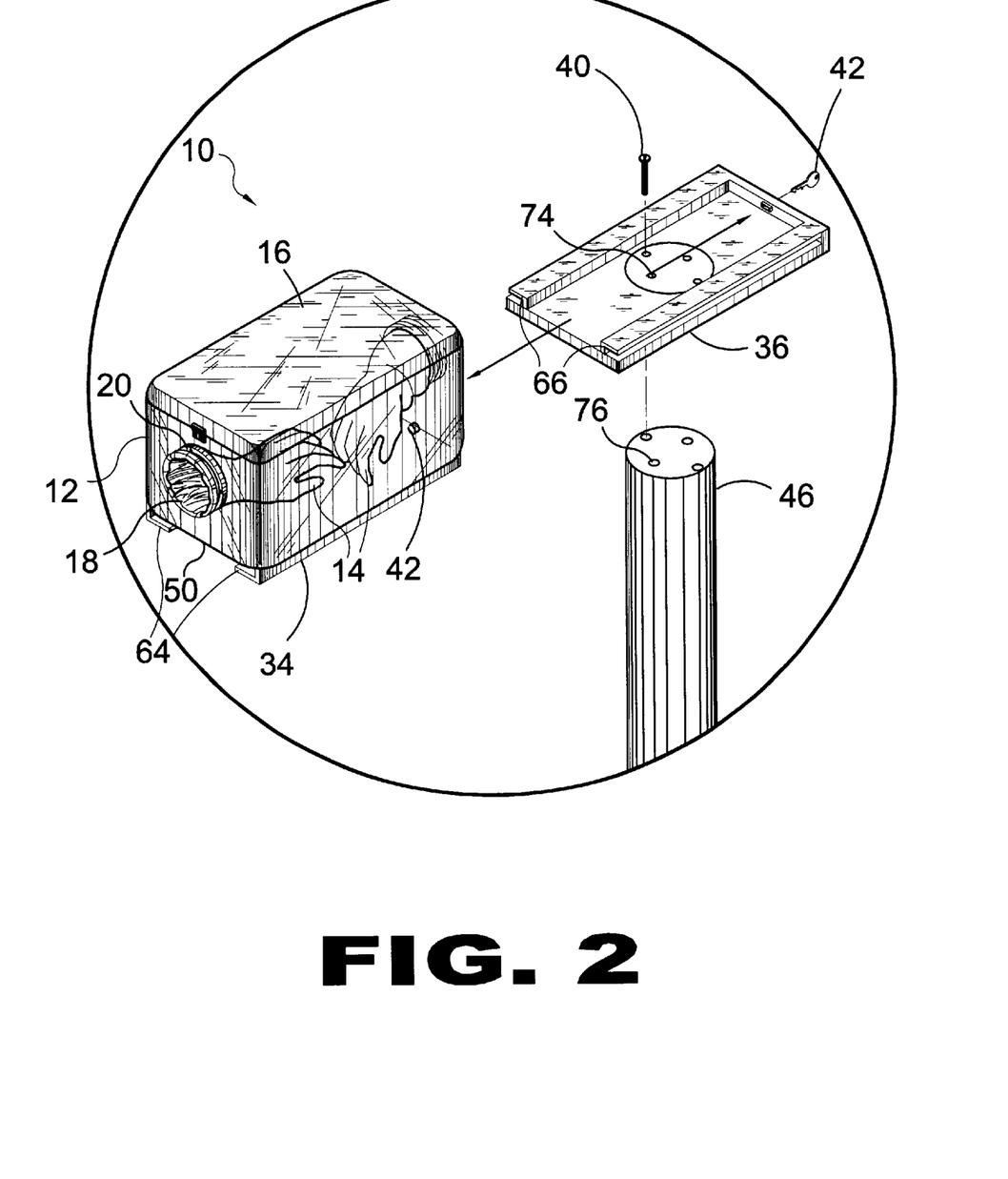
FIG. 2 is a detail view of the mounting bracket of the present invention.

FIG. 1 is an illustrated view of the biological safety mailbox 10. The biological safety mailbox 10 is comprised of a housing member 12 having a hinged lid 16 for inserting mail therein. FIG. 2 is a detail view of the mounting bracket 36 of the present invention. The mounting bracket 36 is a substantially planar member having longitudinal channel elements 66 that mate with the biological safety mailbox channel element 64 positioned on the bottom 50 thereof. The planar channeled bottom 50 has a lock 42 positioned therein for securing the biological safety mailbox 10 thereto. In addition the planar channeled base member has a plurality of apertures 76 whereby the planar base member 36 can be fixedly positioned to a stanchion 46. While the biological safety mailbox 10 is being used as a mailbox the gloves 14 and O-ring 20 can be removed and threaded caps can be attached to seal the access ports 18 of the device.

Figure 3:
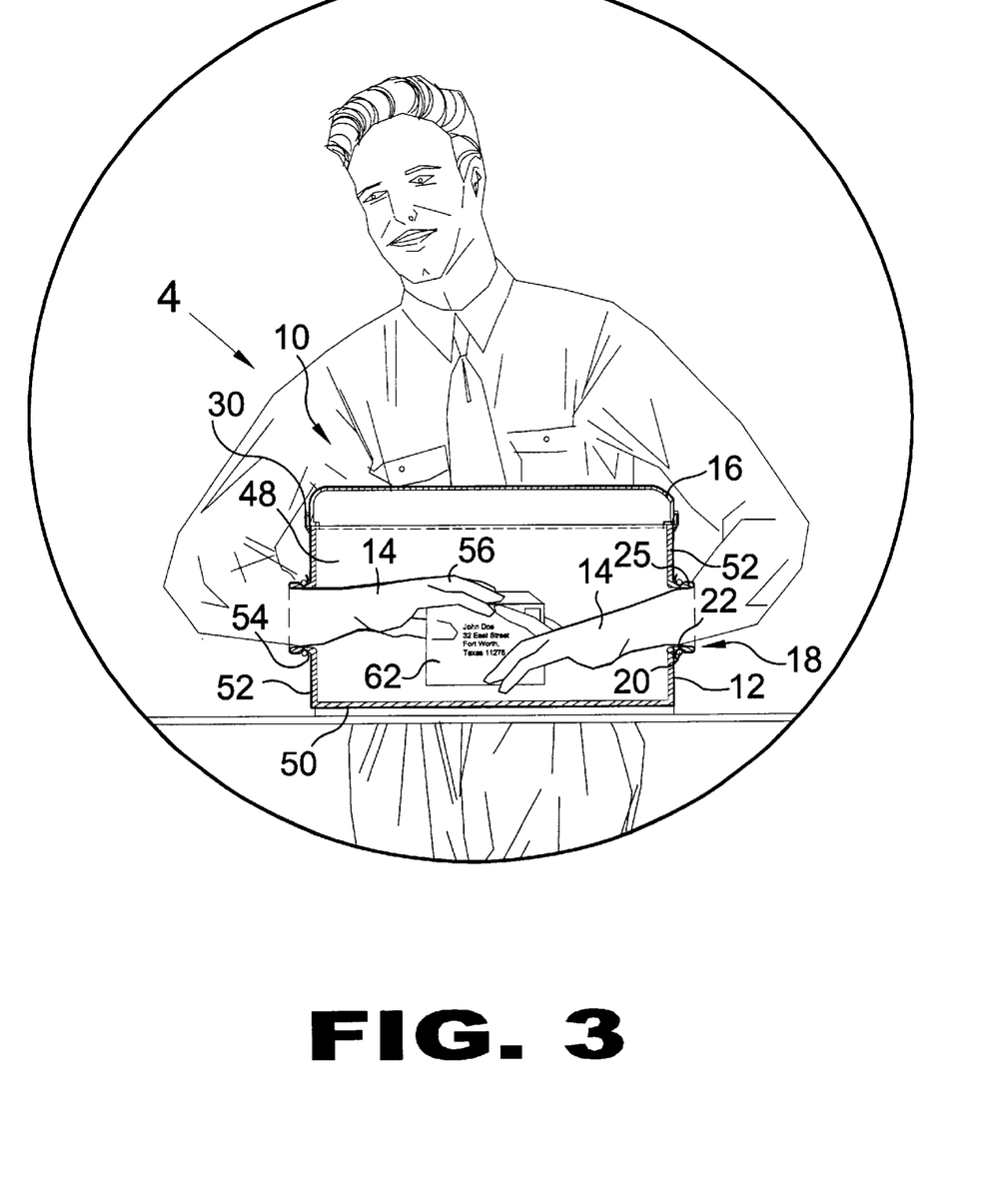
FIG. 3 is an illustrative view of the present invention in use.

FIG. 3 is an illustrative view of the present invention 10 in use. Shown is the biological safety mailbox 10 detached from the post planar channeled base 36 member and positioned on a worksurface. A user has inserted his hands into the gloved access ports 18 and is opening a letter 62 using the gloves 14 within the hermetically sealed enclosure 12. The gloves 14 are folded over the access port wall 18 and fixedly positioned thereto by means of an elastomeric O-ring 20 that is releasably positioned on the exterior periphery groove 22 of the access port wall 25 thereby sealing the access ports 18. Also shown is the hingedly attached lid 16 having closure fasteners 30 hermetically sealing the lid 16 to the base container 12. Once the mail 62 has been examined it can be removed by releasing the lid closure fasteners 30 and flipping opening the lid 16.

Figure 4:
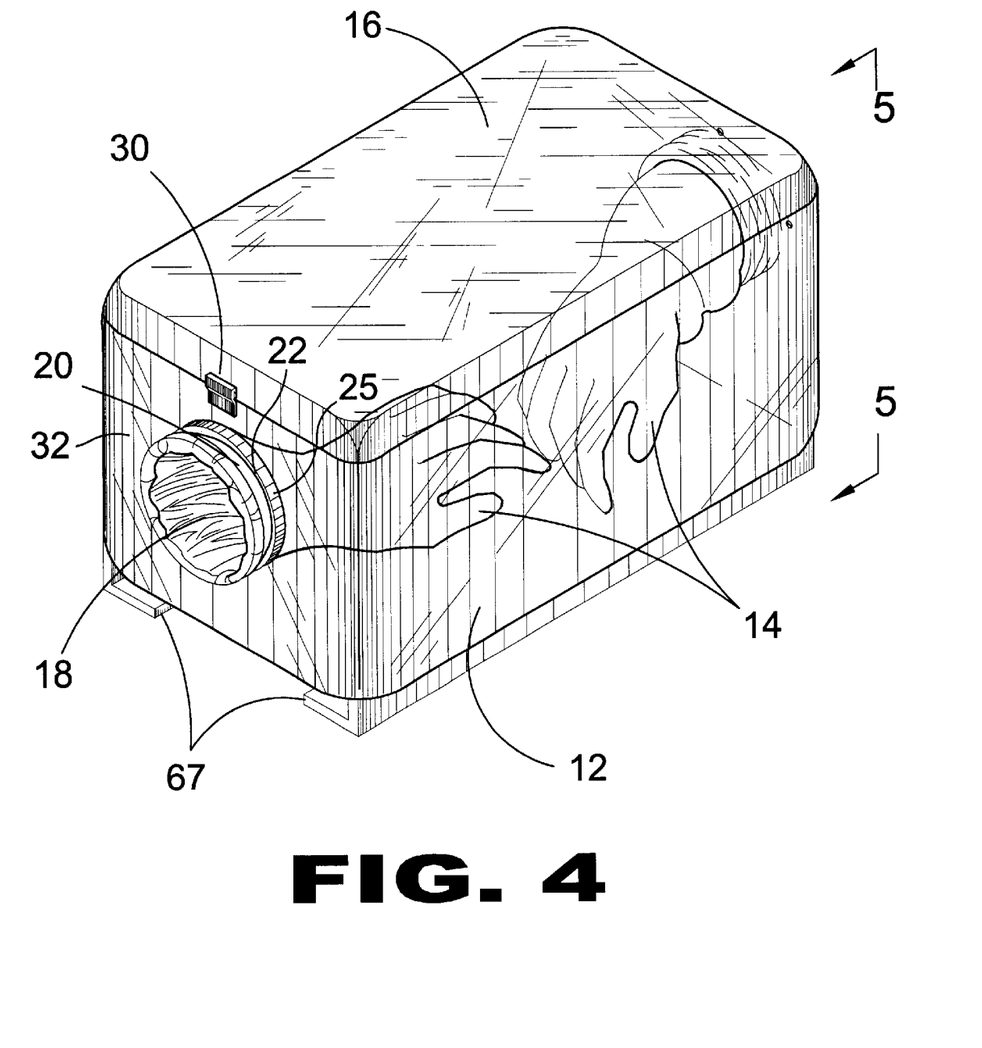
FIG. 4 is a perspective view of the present invention.

FIG. 4 is a perspective view of the present invention 10. Shown is a perspective view of the present invention 10 ready to be used. Shown is a molded base container 12 having exteriorly extending cylindrical access ports 25 positioned on opposing walls 32 of the base container 12 having a circumferential periphery exterior groove 22 thereon. The gloves 14 extend from the interior 48 of the device and are folded over the access port walls 25 extending past the O-ring groove 22. The O-ring 20 being an elastomeric member is stretched over the access port 18 and seated within said groove 22 thereby hermetically sealing the access port 18 from any particulate contaminants that may be present within the biological safety mailbox 10.

Figure 5:
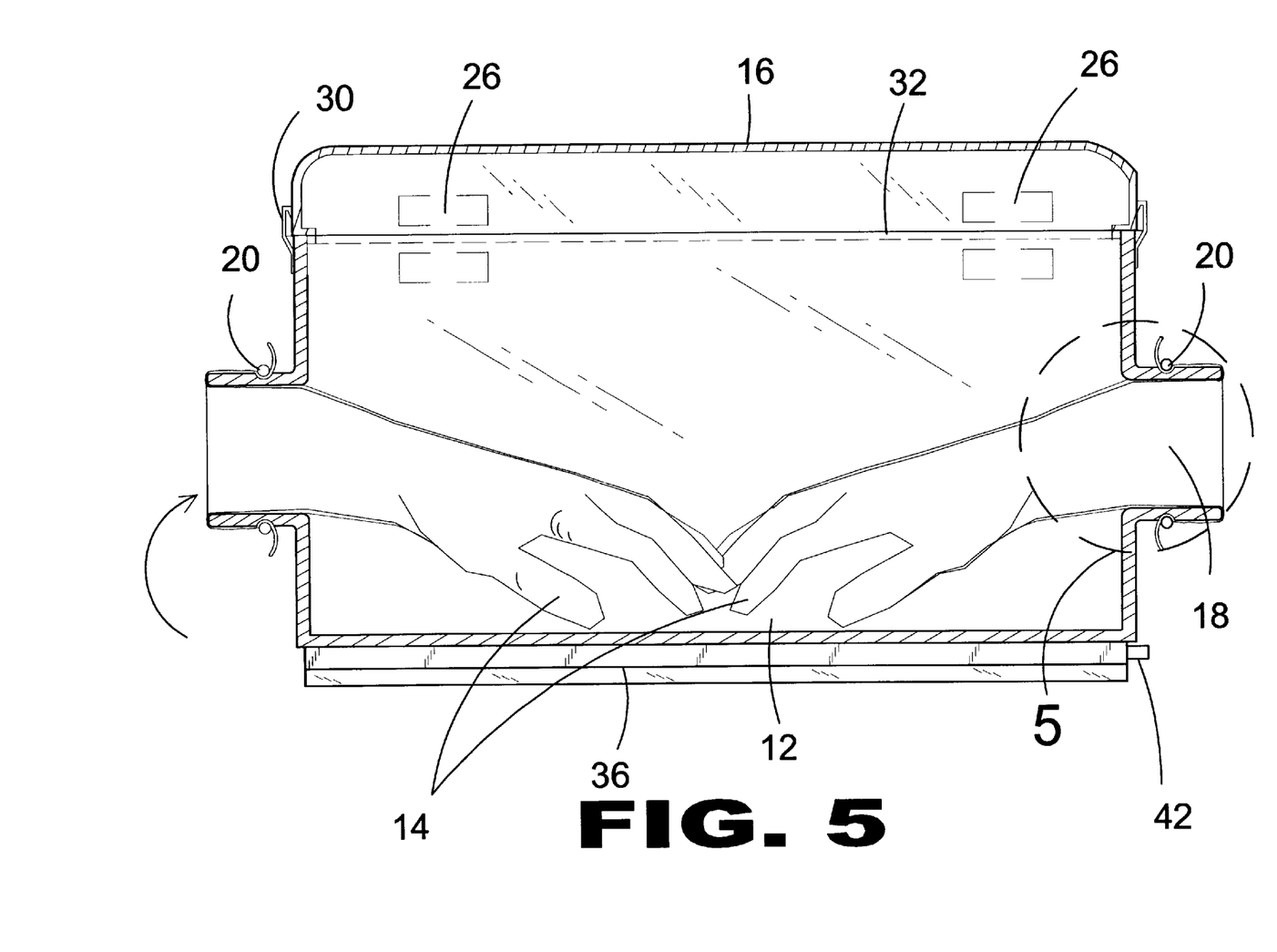
FIG. 5 is a sectional view of the present invention.

FIG. 5 is a sectional view of the present invention. Shown is a sectional view of the biological safety mailbox 10 having a unitary base container 12 with exteriorly extending access ports 18.

Figure 6:
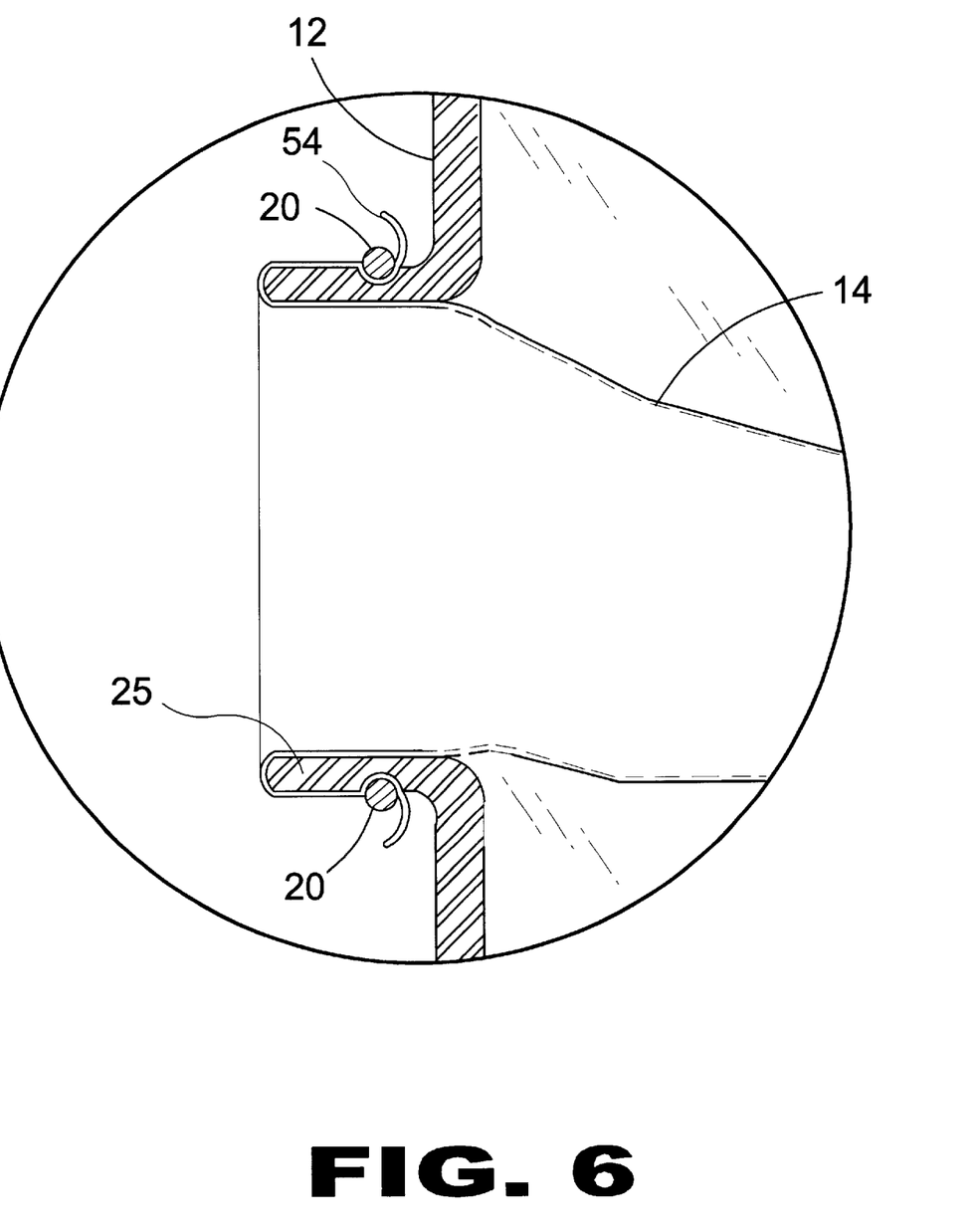
FIG. 6 is a detailed view of the gloved access port of the present invention.

FIG. 6 is a detailed view of the gloved access port 18 of the present invention. Shown is a sectional view of the side wall gloved access port 18. The molded base container has exteriorly extending cylindrical conduits providing access to the interior 48 of the biological safety mailbox 10.

Figure 7:
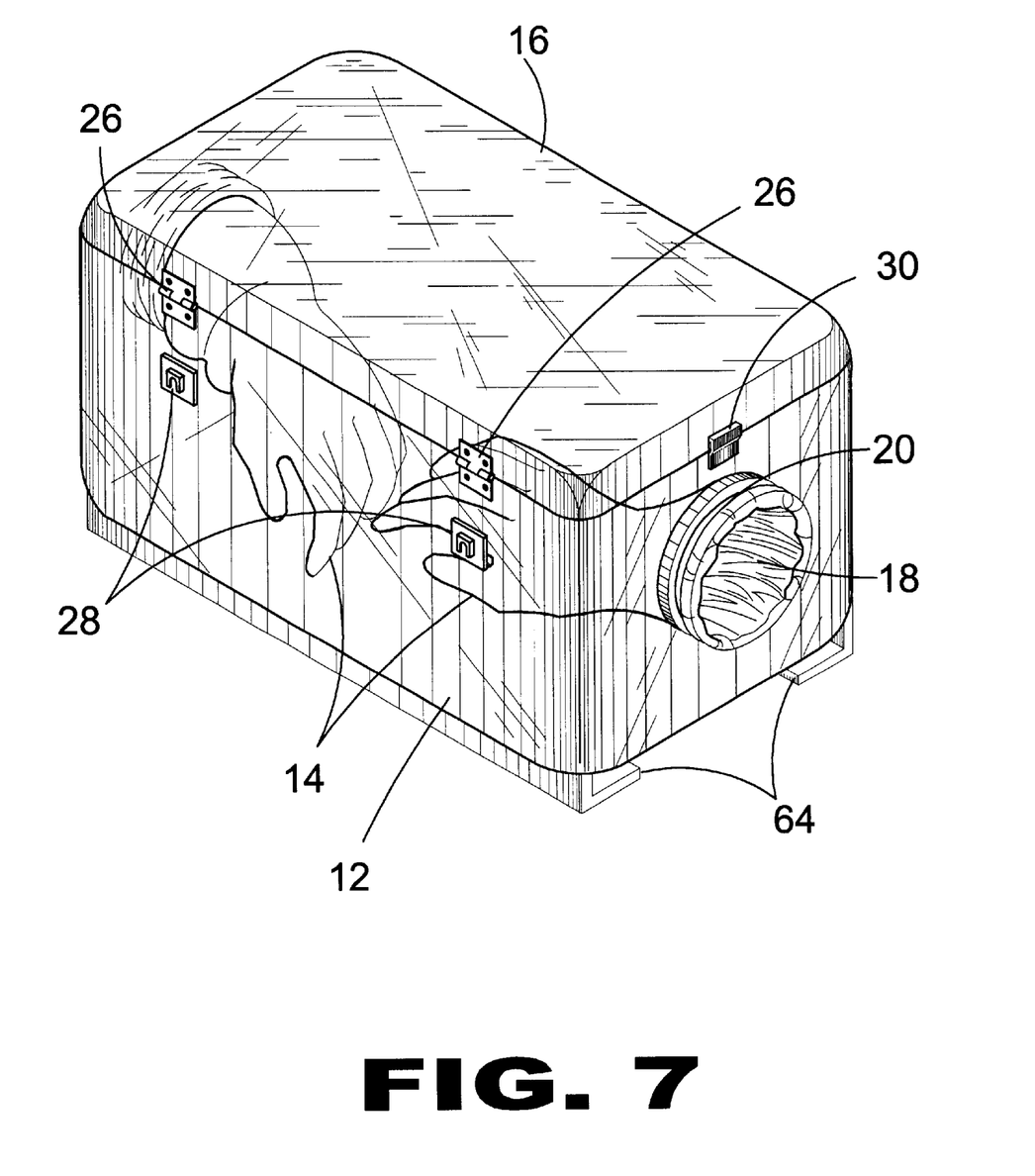
FIG. 7 is a rear perspective view of the present invention.
Figure 8:
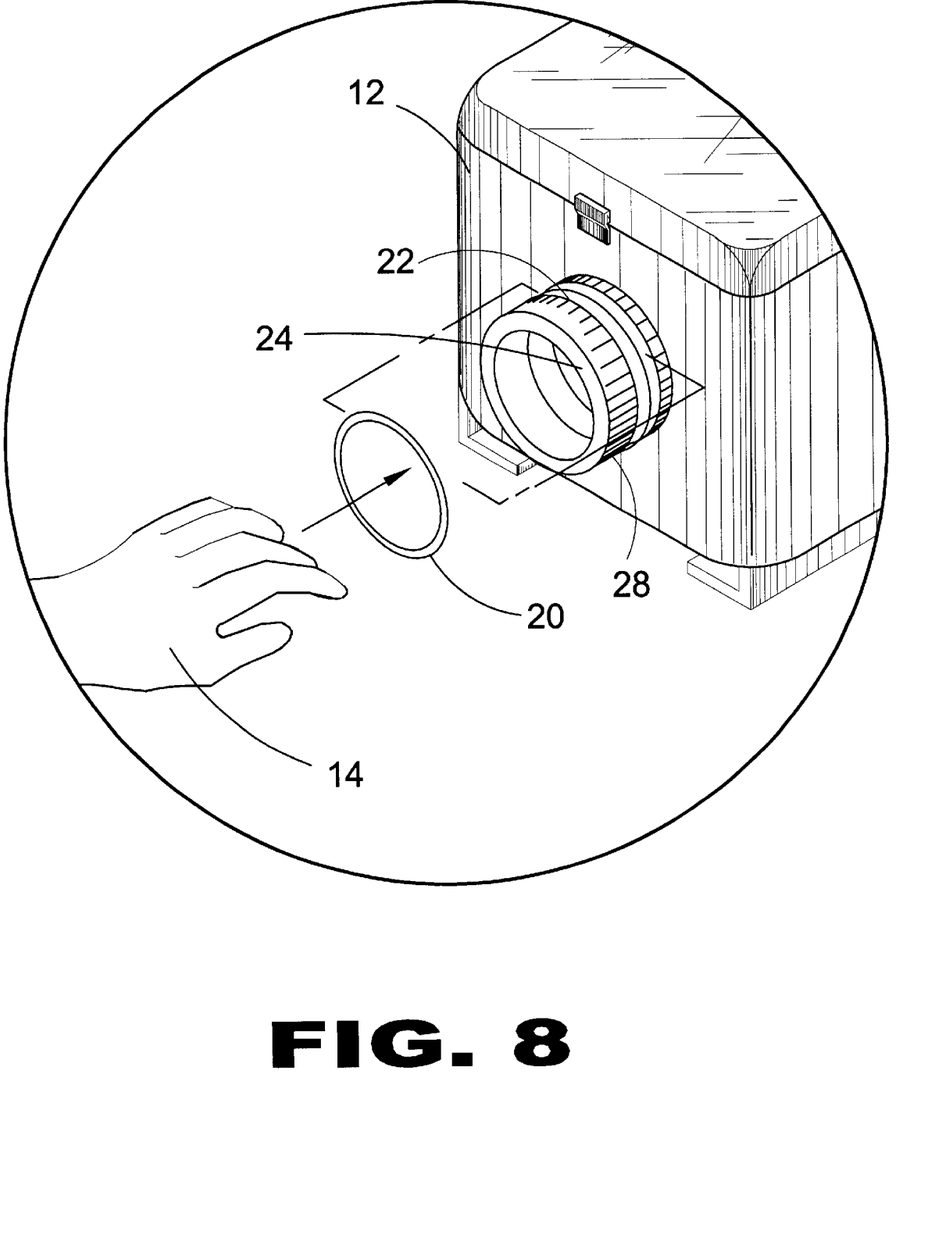
FIG. 8 is an enlarged view of a side of the present invention.

FIG. 7 is a rear perspective view of the present invention 10. Shown is a rear perspective view of the biological safety mailbox 10 having fasteners 28 positioned on the rear wall of the base container 12 whereby the biological safety mailbox 10 can be removably attached to a structure such as a wall having fasteners 28 extending therefrom. Also shown are the lid closure fasteners 30 that keep the lid in an engaged position with the base container gasket thereby hermetically sealing the lid to the base container 12. Once the contents have been opened and inspected the closure fasteners 30 can be disengaged and the lid 16 flipped open for removal of the contents FIG. 8 is an enlarged view of a side of the present invention 10. Shown is an enlarged exploded view of the side of the biological safety mailbox 10 having a gloved access port 18 with the parts removed.

Figure 9:
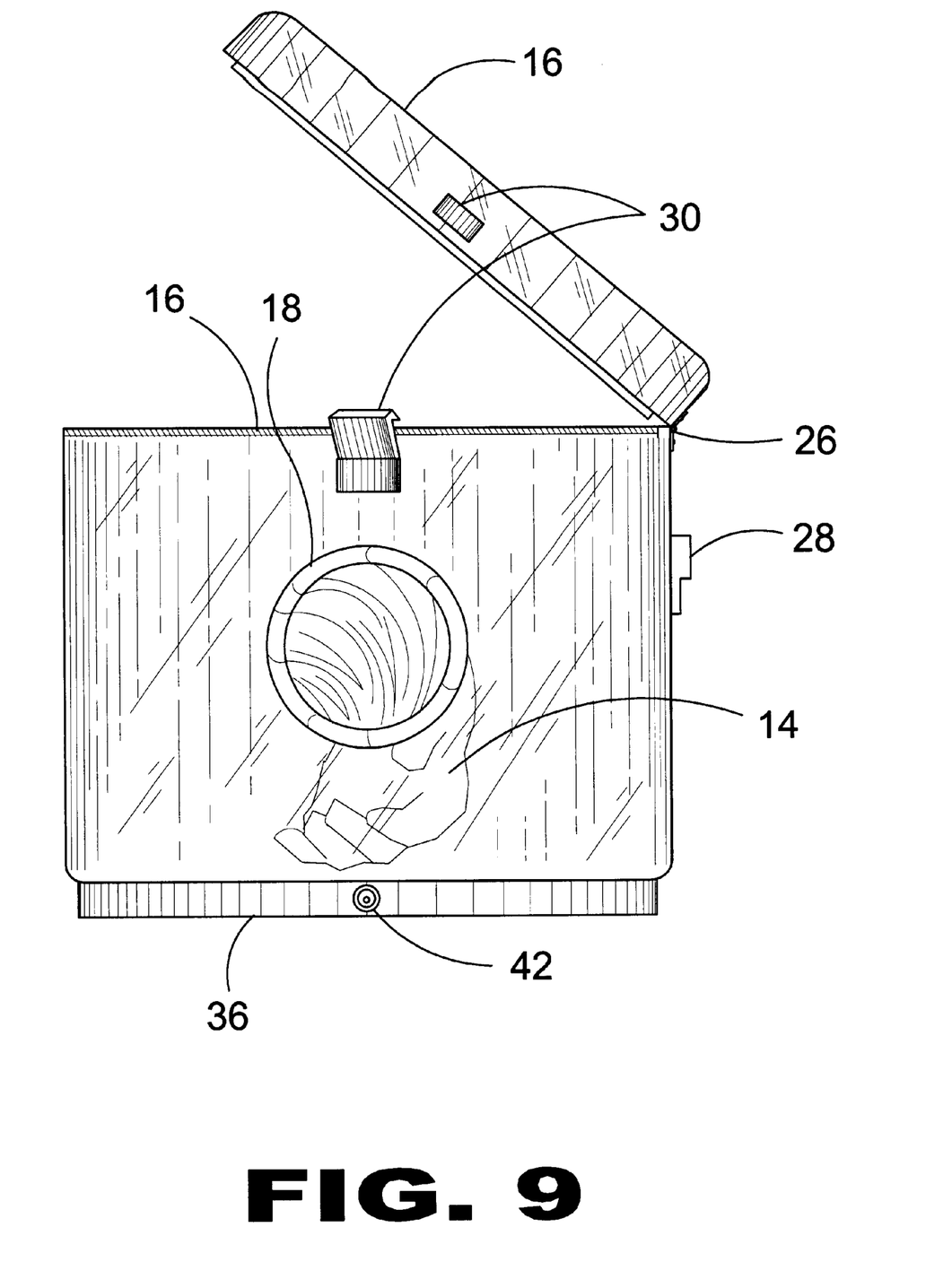
FIG. 9 is a side view of the present invention having a locking element.

FIG. 9 is a side view of the present invention 10 having a locking element 42. Shown is a side view of the biological safety mailbox 10 of the present invention having the lid 16 in an opened position whereby mail or parcels can be inserted and opened for inspection of microorganisms or agents that can be potentially harmful. The lid 16 is hinged to the base container and can be sealed to the base container gasket 32 by engaging the plurality of closure fasteners 30 positioned on the exterior surface of the device.

Figure 10:
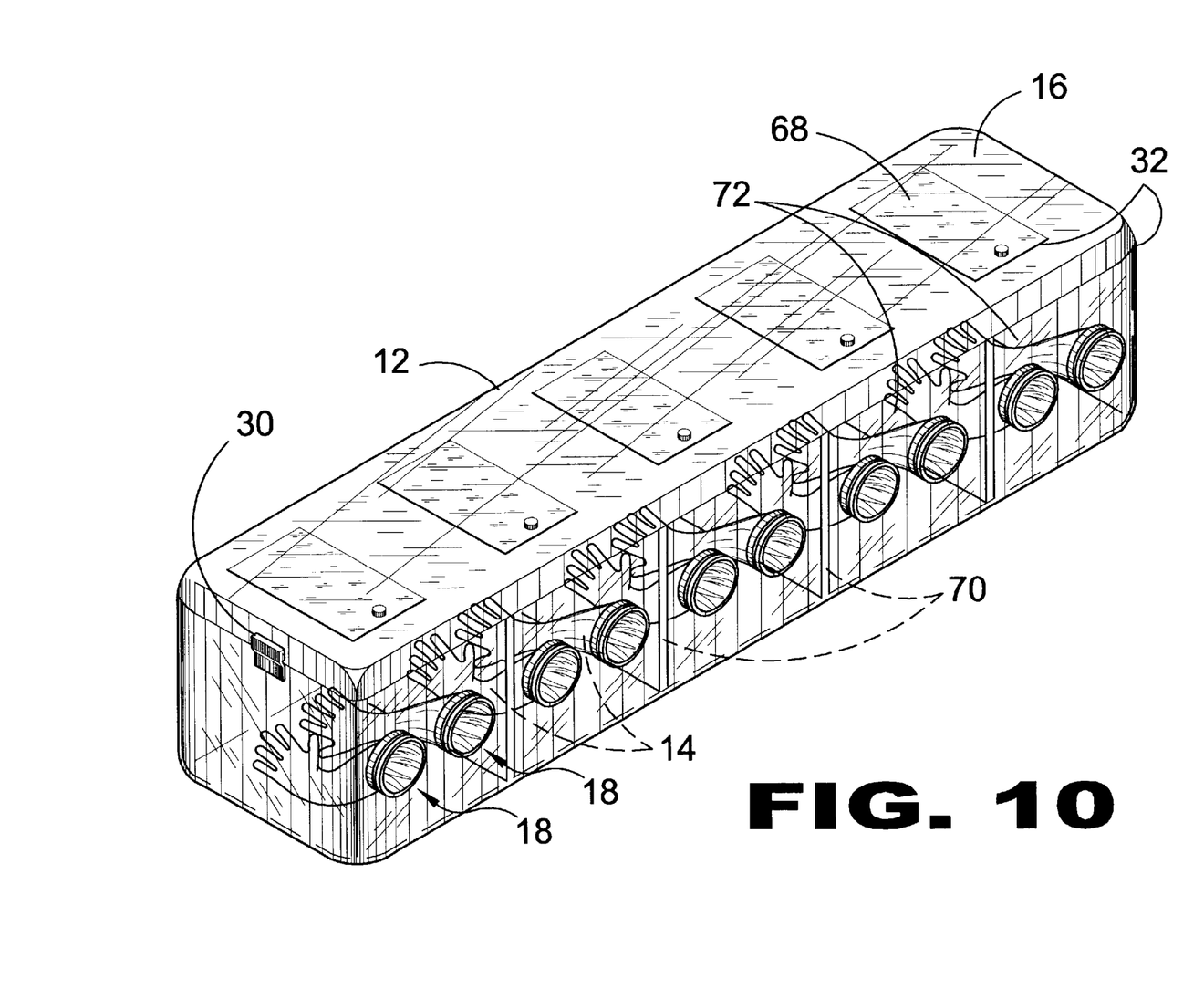
FIG. 10 is the present invention having additional elements for commercial use.

FIG. 10 is the present invention having additional elements for commercial use. Shown is the biological safety mailbox 10 having additional elements in the form of a plurality of lid access ports 68 and gloved access ports 18 whereby a plurality of people can use the device for opening mail and small parcels. Within the enclosure a number of partitions 70 divide the device into a plurality of sealed compartments 72. Each with a top positioned lid access panel 68 mounted onto a hinged master lid providing access to all partitioned compartments at the same time.

Figure 11:
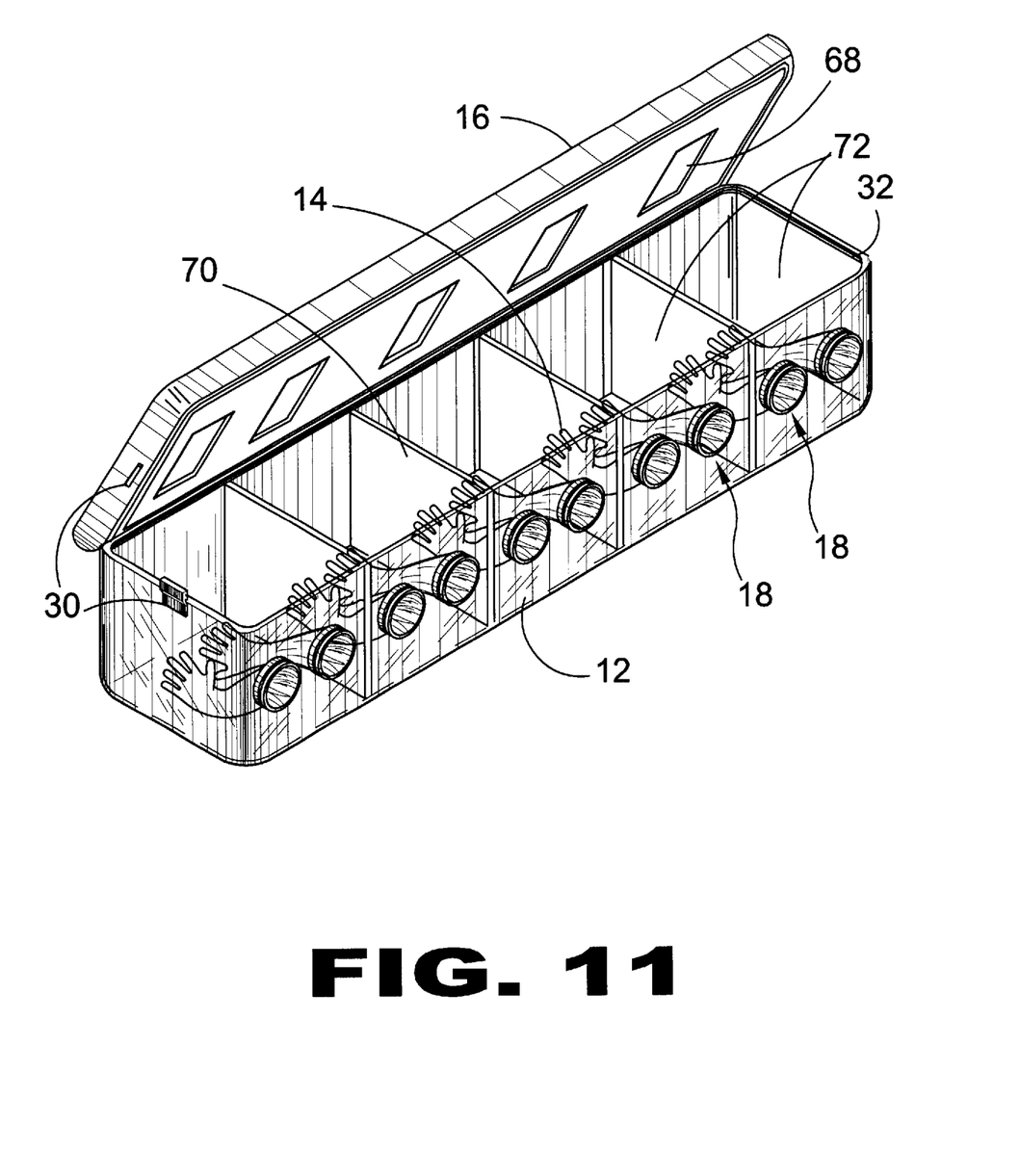
FIG. 11 is a perspective view of the present invention having a plurality of compartments in the open position.

FIG. 11 is a perspective view of the present invention having a plurality of compartments in the open position. Shown is the biological safety mailbox 10 having additional elements in the form of a plurality of lid access ports 68 and gloved access ports 18 whereby a plurality of people can use the device for opening mail 62 and small parcels. Also shown are a number of partitions 70 dividing the device into a plurality of sealed compartments 72 each having a pair of gloved access ports 18.

Figure 12:
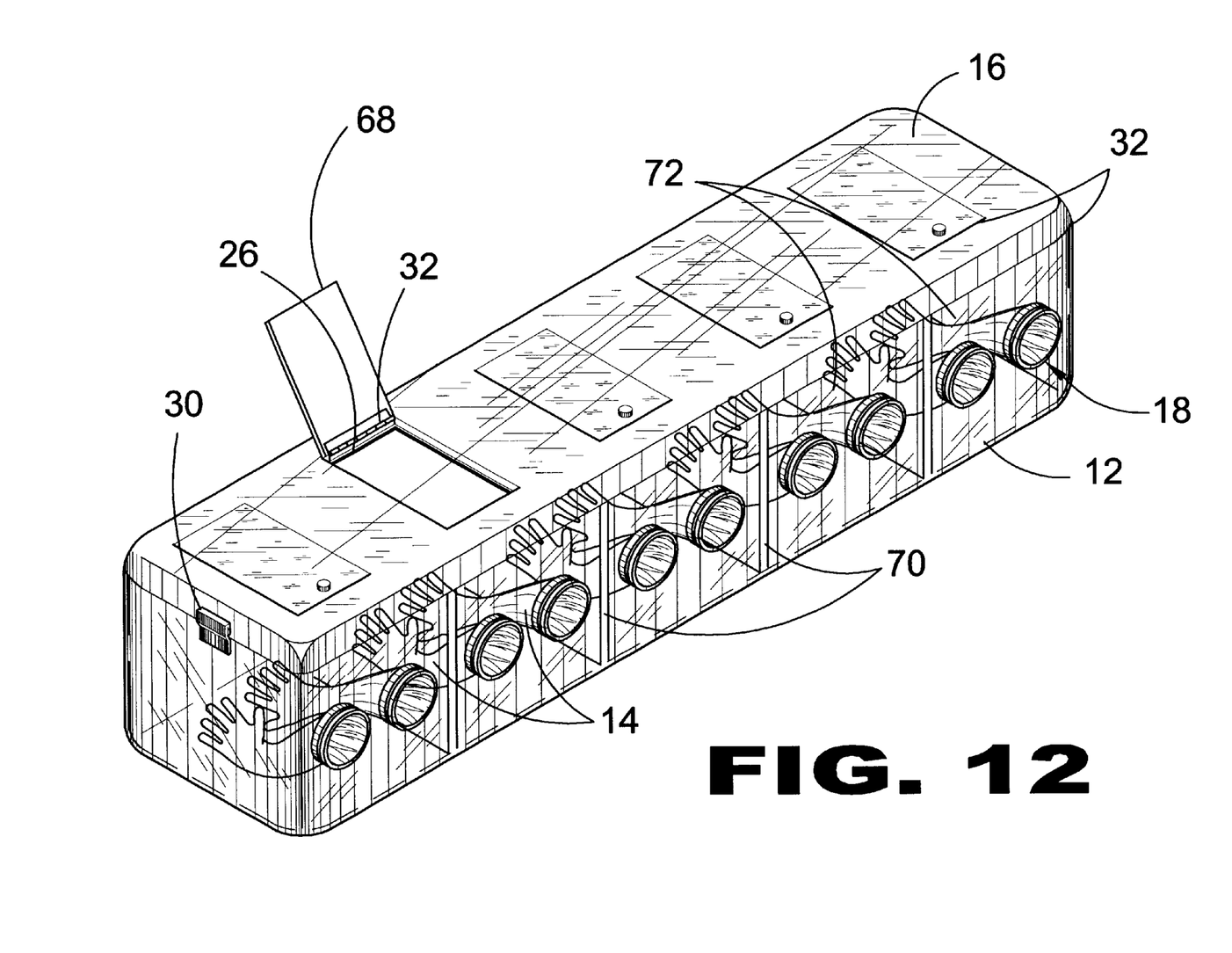
FIG. 12 is a perspective view of the present invention having a single compartment lid open.

FIG. 12 is a perspective view of the present invention 10 having a single compartment lid 16 open. Shown is the biological safety mailbox having additional elements in the form of a plurality of lid access ports 68 providing access to a plurality of hermetically sealed compartments 72. Each of the compartments 72 has a pair of and gloved access ports 18 whereby a plurality of people can use the device for opening mail 62 and small parcels.

Figure 13:
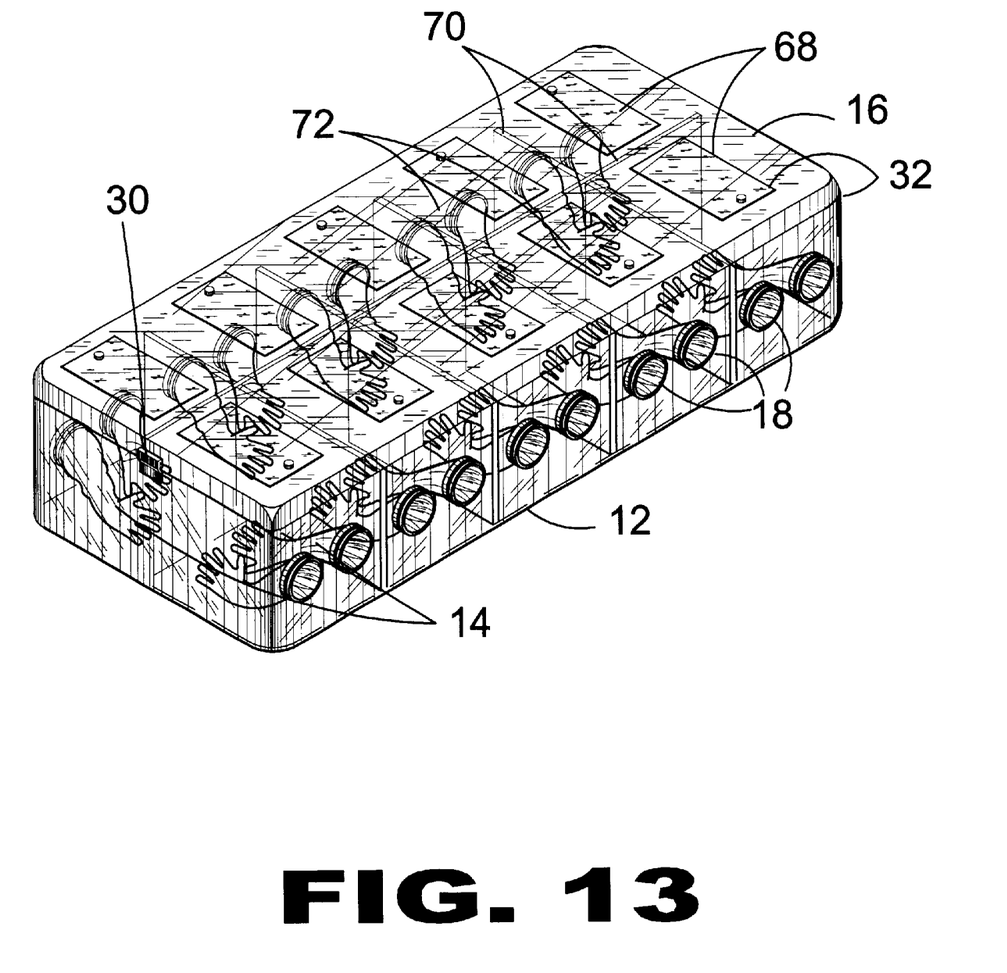
FIG. 13 is a perspective view of the present invention having two access sides for commercial use.

FIG. 13 is a perspective view of the present invention having a plurality of compartments in the open position.

Figure 14:
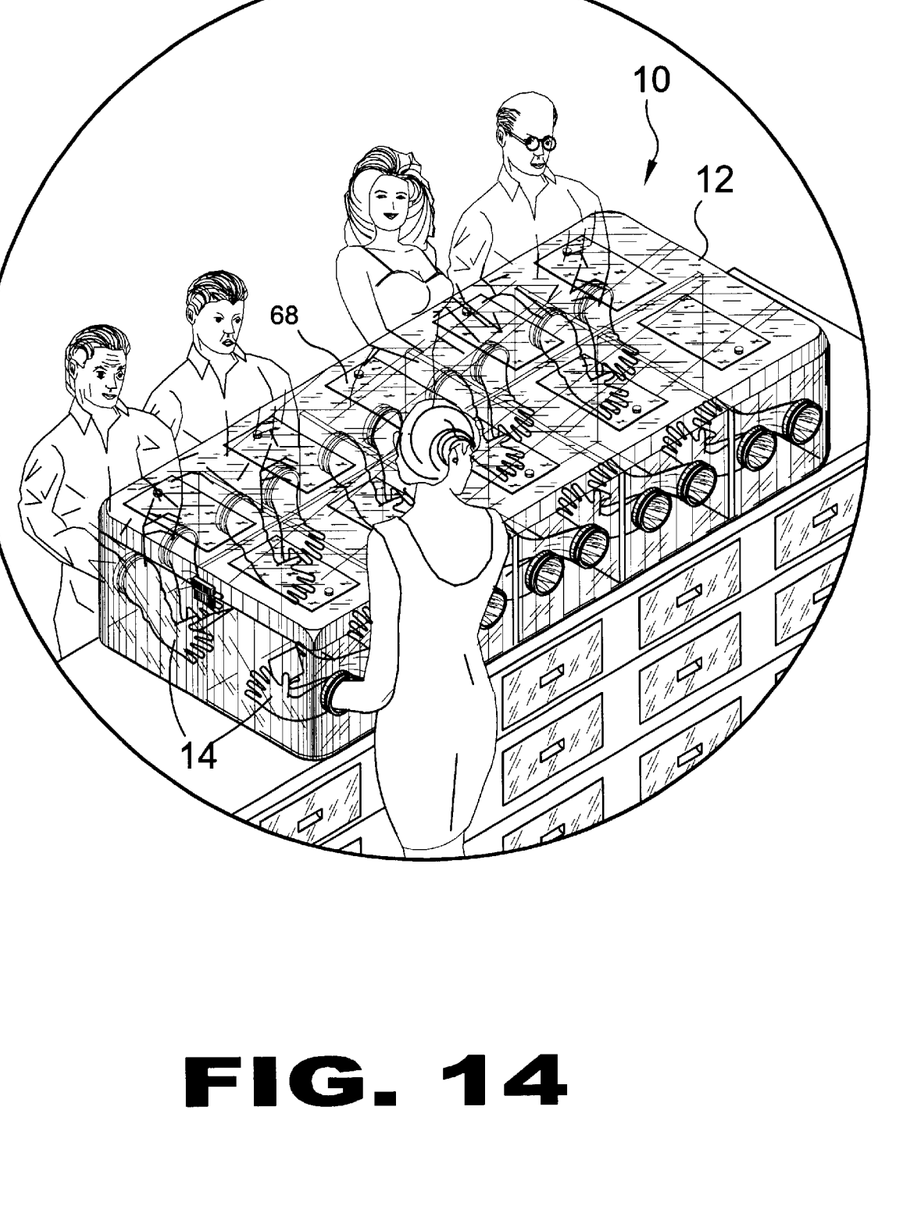
FIG. 14 is a perspective view of the present invention having two access sides for commercial use.

FIG. 14 is a view of the present invention 10 having two access sides for commercial use. Shown is the biological safety cabinet 10 having additional elements in the form of a plurality of lid access ports 68 and gloved access ports 18 whereby a plurality of people can use the device for opening mail and small parcels.

What is claimed is new and desired to be protected by Letters Patent is set forth in the appended claims:

1. A biological safety mailbox comprising:
   a) a housing having a flat, rectangular bottom, four rectangular side walls extending up from said bottom, and a hinged lid enclosing said housing on the top, and two access ports on oppositely facing walls of said side walls respectively, said walls and said bottom being a molded container; said bottom, side walls, and lid defining an interior portion of said housing;
   b) a substantially cylindrical tubular port member extending externally from the periphery of each access port;
   c) a pair of protective gloves and means for removably attaching said protective gloves to said port members for providing gloved access into said housing through said access ports and forming a hermetic seal to prevent particulate matter from passing therebetween;
   d) means for selectively securing and hermetically sealing said lid to said housing;
   e) said means for removably attaching and hermetically sealing said gloves to said access ports comprising an elastomeric O-ring and a channel extending circumferentially around the external distal end of said port member to accommodate said O-ring;
   f) each of said gloves having an open cuff end, a closed finger end and an interior portion, said protective glove being installed by inserting said finger end through said access port of said housing into the interior portion thereof and folding said cuff end of said glove over the distal end of said port member until the edge of said glove extends beyond said O-ring retaining channel whereupon said O-ring is placed over said cuff end and into said O-ring retaining channel thereby hermetically securing said gloves to said access ports;
   g) said means for hermetically securing said lid to said housing including lid closure fasteners on said housing, corresponding lid closure fasteners on said lid that work in concert with said fasteners on said housing, and a gasket that is compressed between said lid and said housing when said lid is secured in the closed position by said fasteners;

h) means for removably securing said housing to a fixed as a post comprising a mounting bracket that is affixed to said post and a means for removably interlocking said housing to said mounting bracket, said interlocking means including two longitudinal, asymmetrical L-shaped tracks protruding downward from said bottom of said housing and two corresponding L-shaped tracks protruding upwards from said mounting bracket so that when aligned end to end the housing can be slidably inserted into said mounting bracket, said interlocking means further including a lock to prevent unauthorized removal of the housing from said mounting bracket.

2. A biological safety mailbox as recited in claim 1, in which said gloves are manufactured of an impermeable material that is of a sufficient gauge so as to be easily manipulated yet resistant to tearing and puncturing.

3. A biological safety mailbox comprising:
   a) a housing having a flat, rectangular bottom, four rectangular side walls extending up from said bottom, and a hinged lid enclosing said housing on the top; said bottom, side walls, and lid defining an interior portion of said housing;
   b) said housing including a plurality of partitions dividing said housing into a plurality of sealed compartments in a row with two side by side access ports for each compartment along one of said side walls of said housing;
   c) a substantially cylindrical tubular port member extending externally from the periphery of each access port;
   d) a pair of protective gloves and means for removably attaching said protective gloves to said port members for providing gloved access into said housing through said access ports and forming a hermetic seal to prevent particulate matter from passing therebetween;
   e) each of said gloves having an open cuff end, a closed finger end and an interior portion, said protective glove being installed by inserting said finger end through said access port of said housing into the interior portion thereof and folding said cuff end of said glove over a distal end of said port member; and
   f) a closeable lid access port in said lid for each compartment for giving separate access to each of said compartments.

4. A biologically hazard free method of depositing and retrieving mail into and out of a mailbox comprising the steps of:
   a) opening a hinged lid on a top of said mailbox and inserting said mail to be collected, said mailbox comprising a housing having a flat, rectangular bottom, and four rectangular side walls extending up from said bottom, said hinged lid enclosing said housing on the top, and two access ports on oppositely facing walls of said side walls with a substantially cylindrical tubular port member extending externally from the periphery of each access port, and a pair of protective gloves with means for removably attaching said protective gloves to said port members for providing gloved access into said housing through said access ports and forming a hermetic seal to prevent particulate matter from passing therebetween;
   b) closing said lid on the top of said housing;
   c) inserting hands in said gloves through said oppositely facing ports to examine the mail deposited into said mailbox; and
   d) upon being satisfied that it is safe to handle said mail directly, removing the hands from said gloves and ports, opening said lid and removing said mail within the mailbox.

5. The method of claim 4 including the step of removably securing said housing to a fixed post using a mounting bracket that is affixed to said post with means for removably interlocking said housing to said mounting bracket, said interlocking means including two longitudinal, assymmetrical L-shaped tracks protruding downward from said bottom of said housing and two corresponding L-shaped tracks protruding upwards from said mounting bracket so that when aligned end to end the housing can be slidably inserted into said mounting bracket, said interlocking means further including a lock to prevent unauthorized removal of the housing from said mounting bracket.

* * * * *